United States Patent
Iwashita

(10) Patent No.: US 8,128,233 B2
(45) Date of Patent: Mar. 6, 2012

(54) ILLUMINATING OPTICAL SYSTEM FOR PROJECTOR INCLUDING CONDENSER LENS AND FIELD LENS

(75) Inventor: Tsutomu Iwashita, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 0 days.

(21) Appl. No.: 13/064,416

(22) Filed: Mar. 23, 2011

(65) Prior Publication Data

US 2011/0194077 A1 Aug. 11, 2011

Related U.S. Application Data

(63) Continuation of application No. 12/073,548, filed on Mar. 6, 2008, now Pat. No. 7,931,375.

(51) Int. Cl.
*G03B 21/14* (2006.01)
(52) U.S. Cl. ............... 353/20; 353/19; 359/483
(58) Field of Classification Search .......... 353/52, 353/98, 94, 20, 19, 30; 362/612, 55, 800; 349/117; 348/801
See application file for complete search history.

(56) References Cited

U.S. PATENT DOCUMENTS

| | | | |
|---|---|---|---|
| 6,831,706 B2 | 12/2004 | Abe et al. | |
| 6,893,131 B2 | 5/2005 | Imahase et al. | |
| 7,252,384 B2 | 8/2007 | Osaka | |
| 7,448,755 B2 | 11/2008 | Osaka | |
| 7,931,375 B2 * | 4/2011 | Iwashita | 353/20 |
| 2005/0237488 A1 | 10/2005 | Yamasaki et al. | |

FOREIGN PATENT DOCUMENTS

| | | |
|---|---|---|
| JP | 2001-174814 (A) | 6/2001 |
| JP | 2001-228440 | 8/2001 |
| JP | 2003-29211 (A) | 1/2003 |
| JP | 2004-45907 | 2/2004 |
| JP | 2005-17785 (A) | 1/2005 |
| JP | 2005-106899 (A) | 4/2005 |
| JP | 2005-173264 (A) | 6/2005 |
| JP | 2005-173357 (A) | 6/2005 |
| JP | 2005-345604 (A) | 12/2005 |

OTHER PUBLICATIONS

Japanese Office Action dated Apr. 26, 2011, with partial English translation.

* cited by examiner

*Primary Examiner* — Francis M Legasse, Jr.
(74) *Attorney, Agent, or Firm* — McGinn IP Law Group, PLLC

(57) ABSTRACT

An illuminating optical system for a projector including a light source and a plurality of display panels. The optical system includes a first integrator, which includes a plurality of lens cells that divide a luminous flux emitted by the light source into a plurality of partial luminous fluxes and that condense the respective partial luminous fluxes, a second integrator, which includes a plurality of lens cells on which the respective partial luminous fluxes are incident, a polarization converting element, which uniformizes polarizing directions of the luminous fluxes having passed through the respective lens cells of the second integrator, and a color separating unit, which separates each of the luminous fluxes from the polarization converting element into a plurality of color lights of different wavelengths. A field lens and a condenser lens are arranged between the polarization converting element and the color separating unit. The field lens superimposes, on the plurality of display panels, the luminous fluxes having passed through the respective lens cells of the first integrator.

16 Claims, 11 Drawing Sheets

FIG. 9

|  | Comment | Radius | Thickness | Index |
|---|---|---|---|---|
| 1 | IT1 | 14.9 | 3.16 | 1.474 |
| 2 |  | ∞ | 26.9 | 1 |
| 3 | IT2 | ∞ | 3.16 | 1.474 |
| 4 |  | -14.9 | 2.44 | 1 |
| 5 | PBS | ∞ | 4 | 1.623 |
| 6 |  | ∞ | 2 | 1 |
| 7 | FL | 267 | 6 | 1.624 |
| 8 |  | ∞ | 158.3 | 1 |
| 9 | CL | 101 | 7 | 1.624 |
| 10 |  | ∞ | 92.7 | 1 |
| 11 | LCD | ∞ | - | - |

|  | Comment | Radius | Thickness | Index |
|---|---|---|---|---|
| 1 | IT1 | 22.8 | 3.16 | 1.474 |
| 2 |  | ∞ | 43.6 | 1 |
| 3 | IT2 | ∞ | 3.16 | 1.474 |
| 4 |  | -22.8 | 2.44 | 1 |
| 5 | PBS | ∞ | 4 | 1.523 |
| 6 |  | ∞ | 2 | 1 |
| 7 | FL | 163 | 5 | 1.624 |
| 8 |  | ∞ | 244 | 1 |
| 9 | CL | 154.3 | 7 | 1.624 |
| 10 |  | ∞ | 6.9 | 1 |
| 11 | LCD | ∞ | - | - |

ILLUMINATING OPTICAL SYSTEM FOR PROJECTOR INCLUDING CONDENSER LENS AND FIELD LENS

The present application is a Continuation Application of U.S. patent application Ser. No. 12/073,548, filed on Mar. 6, 2008 now U.S. Pat. No. 7,931,375.

This application is based upon Japanese patent application No. 2005-242940, filed on Aug. 24, 2005, the disclosure of which is incorporated herein in its entirety by reference.

BACKGROUND OF THE INVENTION (1) Field of the Invention

The present invention relates to an illuminating optical system for a projector typified by a liquid crystal projector.

(2) Description of the Related Art

A known illuminating optical system for a liquid crystal projector comprises an integrator that uniformizes the light intensity of a luminous flux from a light source (Japanese Patent Laid-Open No. 2001-228440 and Japanese Patent Laid-Open No. 2004-045907). The arrangement of optical elements of the illuminating optical system varies. In a known typical arrangement of optical elements, the optical elements are L-, U-, or S-shaped. FIGS. 1, 2, and 3 show examples of an L-shaped arrangement, a U-shaped arrangement, and an S-shaped arrangement.

An illuminating optical system shown in FIG. 1 is for a three-panel liquid crystal projector and illuminates liquid crystal panels 108a to 108c with red light, green light, and blue light, respectively. The illuminating optical system has light source 100, integrators 101a and 101b, polarization converting element 102, field lens 103, dichroic mirrors 104a and 104b, mirrors 105a to 105c, condenser lenses 106a to 106c, and relay lenses 107a and 107b.

Light source 100 comprises a lamp typified by an ultra-high pressure mercury lamp and a reflector. Light is emitted directly by the lamp or light from the lamp is reflected by the reflector, and then a substantially parallel luminous flux is emitted from the reflector. In a direction in which the luminous flux emitted by light source 100 advances, integrators 101a and 101b, polarization converting element 102, field lens 103, and dichroic mirror 104a are sequentially arranged. Integrators 101a and 101b uniformize the light intensity of the luminous flux from light source 100. Each of integrators 101a and 101b comprise a plurality of lens cells arranged in a matrix. Polarization converting element 102 polarizes the luminous flux from integrators 101a and 101b in the same direction. Polarization converting element 102 is composed of a polarized beam splitter, a phase plate, or the like. Dichroic mirror 104a reflects B (blue) light of the luminous flux from field lens 103 while allowing the remaining R (red) light and G (green) light to pass through.

Mirror 105a is located in the advancing direction of the B light reflected by dichroic mirror 104a. Condenser lens 106a and liquid crystal panel 108a are sequentially arranged in the advancing direction of the light (B light) reflected by mirror 105a.

Dichroic mirror 104b is arranged in the advancing direction of the R light and G light having passed through dichroic mirror 104a. Dichroic mirror 104b reflects the G light, while allowing the R light to pass through. Condenser lens 106b and liquid crystal panel 108b are sequentially arranged in the advancing direction of the light (G light) reflected by dichroic mirror 104b. Relay lens 107a and mirror 105b are sequentially arranged in the advancing direction of the light (R light) having passed through dichroic mirror 104b. Relay lens 107b and mirror 105c are sequentially arranged in the advancing direction of the light reflected by mirror 105b. Condenser lens 106c and liquid crystal panel 108c are sequentially arranged in the advancing direction of the light reflected by mirror 105c.

In the illuminating optical system, after a luminous flux is emitted by light source 100, the light intensity of the luminous flux is uniformized by integrators 101a and 101b, and the polarizing direction of the luminous flux is uniformized by polarization converting element 102. The resultant luminous flux is incident on field lens 103. The luminous flux having passed through field lens 103 is separated into R light, G light, and B light by dichroic mirrors 104a and 104b. The R light illuminates liquid crystal panel 108c, the G light illuminates liquid crystal panel 108b, and the B light illuminates liquid crystal panel 108a.

R image light, G image light, and B image light generated by liquid crystal panels 108a to 108c are subjected to color synthesis by cross dichroic prism 109. The resultant light is projected on a screen by projection lens 110.

An illuminating optical system with a U-shaped arrangement shown in FIG. 2 is also for a three-panel liquid crystal projector but is different from the optical system shown in FIG. 1 in that fold-back mirror 111 is located between field lens 103 and dichroic mirror 104a. A luminous flux from field lens 103 is reflected by fold-back mirror 111 at substantially 90 degrees before entering dichroic mirror 104a. The optical elements are arranged in. U form.

An illuminating optical system with an S-shaped arrangement shown in FIG. 3 is also for a three-panel liquid crystal projector, but in this illuminating optical system, the arrangement of dichroic mirrors 104a and 104b, mirrors 105a to 105c, condenser lenses 106a to 106c, and relay lenses 107a and 107b is laterally opposite to that in the optical system shown in FIG. 2. In this optical system, dichroic mirror 104a reflects the R light and G light in the luminous flux from fold-back mirror 111, while allowing the remaining B light to pass through. Mirror 105a is located in the advancing direction of the B light having passed through dichroic mirror 104a. Liquid crystal panel 108a is irradiated, via condenser lens 106a, with the B light reflected by mirror 105a. Dichroic mirror 104b is located in the advancing direction of the R light and G light. Dichroic mirror 104b reflects the G light, while allowing the R light to pass through. Liquid crystal panel 108b is irradiated, via condenser lens 106b, with the G light reflected by dichroic mirror 104b. The R light passed through dichroic mirror 104b passes sequentially through relay lens 107a, mirror 105b, relay lens 107b, mirror 105c, and condenser lens 106c. Liquid crystal panel 108c is then irradiated with the R light.

The above-described illuminating optical system poses the following problems.

The polarization converting element has a plurality of polarization converting sections provided in association with the intervals among arc images of the light source projected in the vicinity of the respective optical axes of the lens cells of the integrator. Each of the polarization converting sections can uniformize the polarizing directions of luminous fluxes from the lens cells. In the polarization converting elements, part of the incident light which falls out of the effective aperture (the aperture defining the range within which polarization conversion is possible) of each polarization converting element does not contribute to polarization conversion, correspondingly reducing polarization conversion efficiency.

For an illuminating optical system that superimposes, on a liquid crystal panel surface, a luminous flux having passed through each of the lens cells of the first integrator located closer to the light source, to improve the polarization conversion efficiency, it is necessary to minimize the size of each of the arc images of the light source formed on the second integrator to reduce the quantity of light falling out of the effective aperture of the polarization converting element. However, in the illuminating optical systems having the L-, U-, and S-shaped arrangements, the field lens and the condenser lens have a long synthesizing focal distance, necessarily increasing the focal distance of the first integrator. This increases the ratio (magnification) of the size of an arc in the light source to the size of each of the arc images formed on the second integrator, resulting in an increased size of each of the arc images formed on the second integrator. In particular, in an illuminating optical system that has a U- or S-shaped arrangement including a fold-back mirror between a field lens and a condenser lens, the field lens and the condenser lens have a synthesizing focal distance longer than that in an illuminating optical system having an L-shaped arrangement. The former illuminating optical system thus has reduced polarization conversion efficiency.

Interposing a new lens between the field lens and the condenser lens enables a reduction in the synthesizing focal distance of the field lens and the condenser lens and thus in the size of each of the arc images formed on the second integrator. However, in this case, the addition of the new lens reduces transmittance and increases costs.

SUMMARY

An exemplary object of the present invention is to solve the problem described above and to provide an illuminating optical system for a projector with a high illumination efficiency.

To accomplish the object, a first exemplary aspect of the present invention provides an illuminating optical system including a light source and a plurality of display panels, the illuminating optical system comprising:

a first integrator that includes a plurality of lens cells that divide a luminous flux emitted by the light source into a plurality of partial luminous fluxes and that condense the respective partial luminous fluxes;

a second integrator that includes a plurality of lens cells on which the respective partial luminous fluxes are incident;

a polarization converting element that uniformizes polarizing directions of the luminous fluxes that have passed through the respective lens cells of the second integrator; and a color separating unit that separates each of the luminous fluxes from the polarization converting element into a plurality of color lights including different wavelengths, wherein a field lens and a condenser lens are arranged between the polarization converting element and the color separating unit, the field lens superimposes, on the plurality of display panels, the luminous fluxes that have passed through the respective lens cells of the first integrator, and the condenser lens is located closer to the color separating unit.

A second exemplary aspect of the present invention provides an illuminating optical system for a projector including a light source and a plurality of display panels, the illuminating optical system comprising:

a first integrator that includes a plurality of lens cells that divide a luminous flux emitted by the light source into a plurality of partial luminous fluxes and that condense the respective partial luminous fluxes;

a second integrator that includes a plurality of lens cells on which the respective partial luminous fluxes are incident;

a polarization converting element that uniformizes polarizing directions of the luminous fluxes that have passed through the respective lens cells of the second integrator;

a first dichroic mirror that reflects a first color light in the luminous flux from the polarization converting element while allowing a second color light and a third color light in the luminous flux to pass through, the second color light and the third color light each comprising a wavelength region different from that of the first color light;

a second dichroic mirror that reflects the second color light in the luminous flux that has passed through the first dichroic mirror while allowing the third color light in the luminous flux to pass through;

a first reflection mirror that reflects the first color light reflected by the first dichroic mirror;

a field lens located between the polarization converting element and the first dichroic mirror;

a first condenser lens located between the first dichroic mirror and the first reflection mirror; and a second condenser lens located between the first dichroic mirror and the second dichroic mirror, wherein the field lens is configured to superimpose the luminous fluxes that have passed through the respective lens cells of the first integrator, on the plurality of display panels.

The above and other objects, features, and advantages of the present invention will become apparent from the following description with reference to the accompanying drawings which illustrate examples of the present invention.

BRIEF DESCRIPTION OF THE DRAWINGS

In the accompanying drawings:

FIG. 9 is a diagram showing design data on an illuminating optical system according to an exemplary embodiment of the present invention;

DETAILED DESCRIPTION OF THE EXEMPLARY EMBODIMENTS

Figure 5:
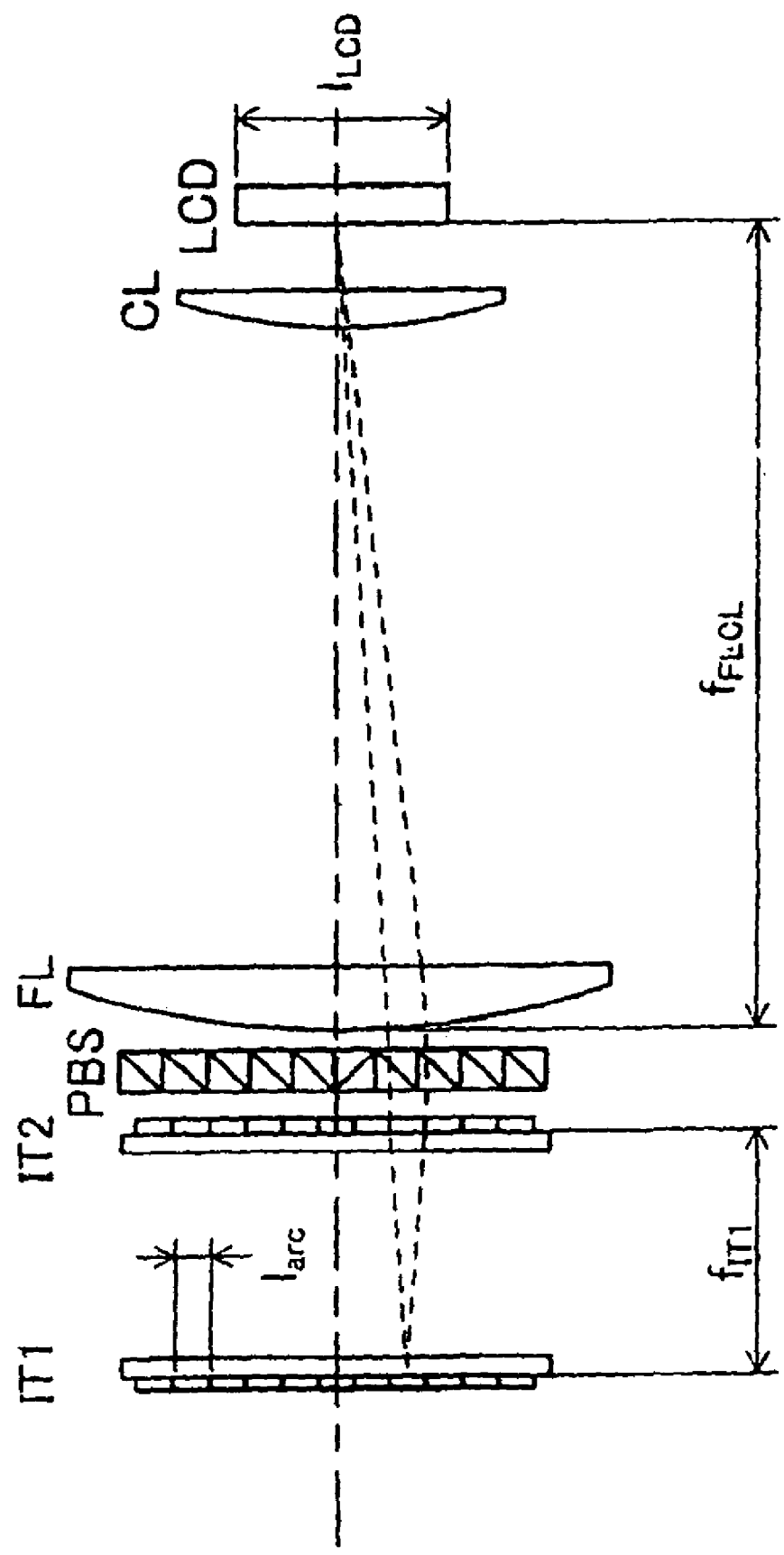
FIG. 5 is a diagram illustrating the principle of the arrangement of optical elements of the illuminating optical system for the projector according to an exemplary embodiment of the present invention.

First, the principle of the present invention will be described. FIG. 5 is a diagram illustrating the arrangement of optical elements of an illuminating optical system for a projector according to an exemplary embodiment of the present invention.

As shown in FIG. 5, the illuminating optical system for the projector according to the exemplary embodiment illuminates liquid crystal panel LCD and includes integrators IT1 and IT2, polarization converting element PBS, field lens FL, and condenser lens CL arranged in this order with integrators IT1 and IT2 arranged closest to a light source. Arc images (rectangular image) of the light source are formed on integrator IT2 by integrator IT1 and then formed on liquid crystal panel LCD while being magnified by field lens FL and condenser lens CL. An image formation magnification relationship as shown in Formulae 1 and 2 holds true between integrator IT1 and liquid crystal panel LCD.

[Formula 1]

$$l_{IT1} = M l_{LCD} \qquad (1)$$

[Formula 2]

$$f_{IT1} = M f_{FL \cdot CL} \qquad (2)$$

In these formulae, M denotes the horizontal magnification of IT1 and LCD, $l_{IT1}$ denotes the size (outer diameter) of each of the lens cells constituting IT1, $l_{LCD}$ denotes the length of a long side of LCD, $f_{IT1}$ denotes the focal distance of the lens cell in IT1, and $f_{FC \cdot CL}$ denotes an FC·CL synthesizing focal distance. Formula 2 indicates that in an optical system with a relatively long FL·CL synthesizing focal distance $f_{FL \cdot CL}$ like the U-shaped arrangement shown in FIG. 2 and the S-shaped arrangement shown in FIG. 3, IT1 has a relatively long focal distance $f_{IT1}$.

Figure 6:
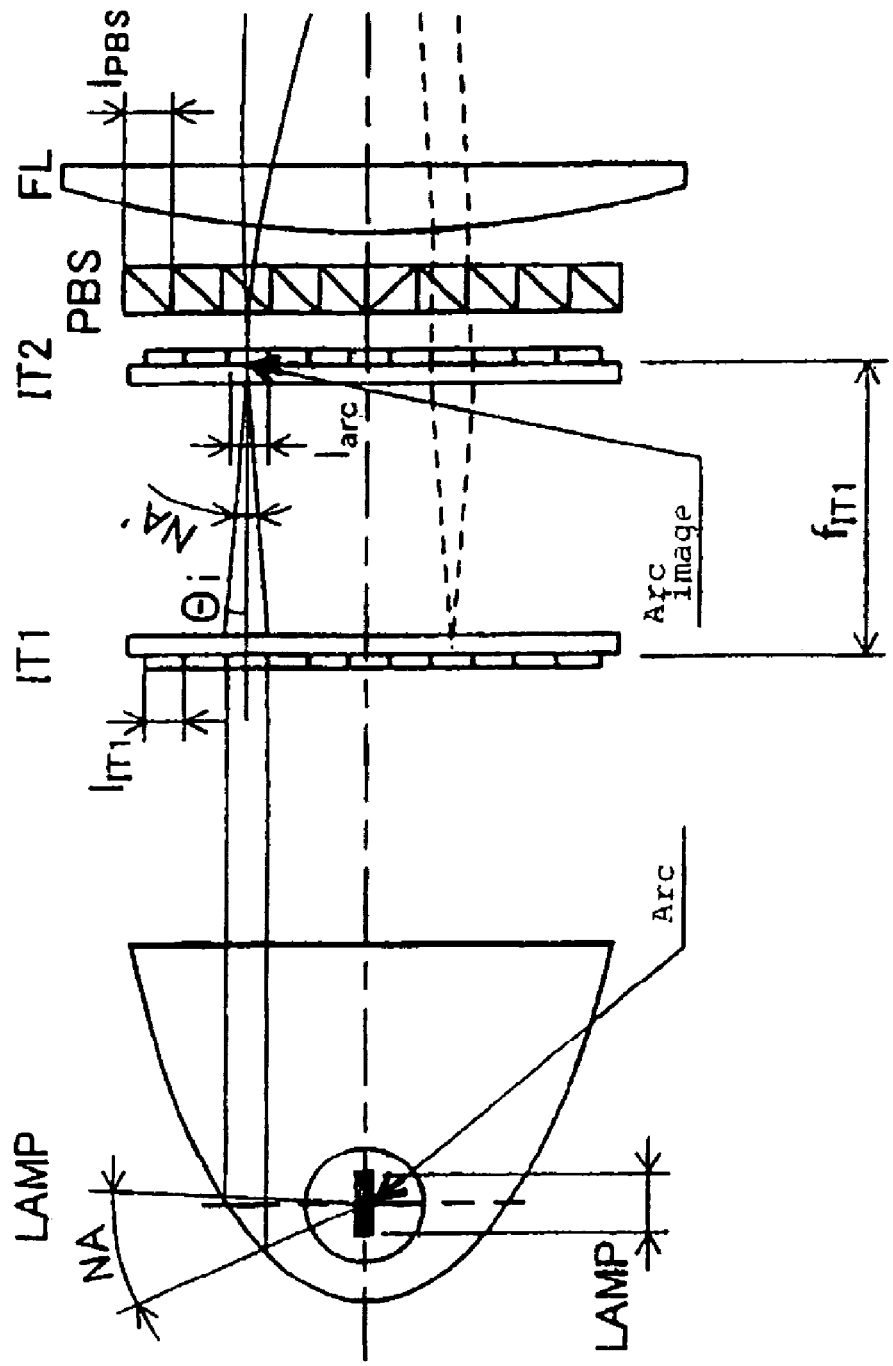
FIG. 6 is a diagram illustrating how an integrator forms an arc image.

FIG. 6 illustrates how arc images are formed. Integrator IT1 forms arc images of the light source on integrator IT2. The size of each of the arc images formed on IT2 is given by:

[Formula 3]

$$l_{arc} \cong l_{LAMP} \times \frac{NA}{NA'} \qquad (3)$$

where $I_{arc}$ denotes the effective aperture of each of the arc images formed on IT2, $I_{LAMP}$ denotes the effective aperture of the light source arc, NA denotes the numerical aperture of the light source, and NA' denotes the numerical aperture of IT1. The numerical aperture NA of IT1 can be expressed by:

[Formula 4]

$$NA' = \sin \theta_i \qquad (4)$$

where $\theta_i$ denotes the condensation angle of IT1.

Formula 3 is substituted into Formula 4 to obtain:

[Formula 5]

$$l_{arc} \cong l_{LAMP} \times \frac{NA}{\sin \theta_i} \qquad (5)$$

Furthermore, the condensation angle $\theta_i$ of IT1 can be expressed by:

[Formula 6]

$$\theta_i = 2\tan^{-1} \frac{l_{IT1}}{f_{IT1}} \qquad (6)$$

Formula 6 is substituted into Formula 5 to obtain:

[Formula 7]

$$l_{arc} \cong l_{LAMP} \times \frac{NA}{\sin\left(2\tan^{-1} \frac{l_{IT1}}{f_{IT1}}\right)} \qquad (7)$$

Moreover, Formulae 1 and 2 are substituted into Formula 7 to obtain:

[Formula 8]

$$l_{arc} \cong l_{LAMP} \times \frac{NA}{\sin\left(2\tan^{-1} \frac{l_{LCD}}{f_{FLCL}}\right)} \qquad (8)$$

Formula 8 indicates that large arc images $I_{arc}$ are provided by an optical system of the U- or S-shaped arrangement which has a relatively long FL·CL synthesizing focal distance $f_{FL \cdot CL}$.

Figure 7:
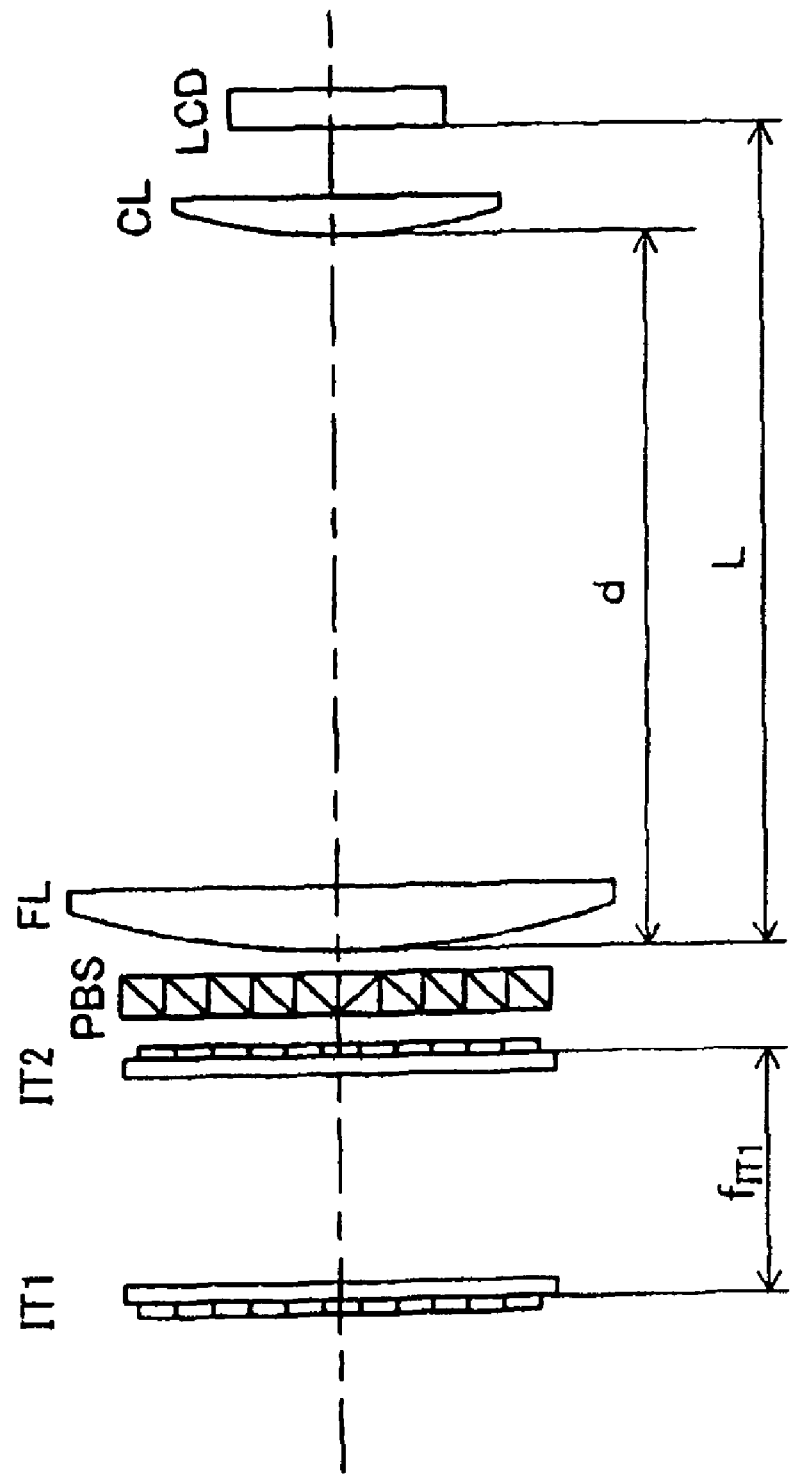
FIG. 7 is a diagram illustrating the relationship between the distance between a field lens and a condenser lens and the synthesizing focal distance of the field lend and the condenser lens.

FIG. 7 illustrates the relationship between the distance between FL and CL and FL·CL synthesizing focal distance $f_{FL \cdot CL}$. FL·CL synthesizing focal distance $f_{FL \cdot CL}$ is given by:

[Formula 9]

$$\frac{1}{f_{FL \cdot CL}} = \frac{1}{f_{FL}} + \frac{1}{f_{CL}} - \frac{d}{f_{FL} f_{CL}} \qquad (9)$$

where $f_{FL}$ denotes the focal distance of the field lens, $f_{CL}$ denotes the focal distance of the condenser lens, and d denotes the distance between FL and CL (the distance between the centers of the lenses).

In an optical system in which CL parallelizes principle rays from FL, FL-CL distance d can be expressed by:

[Formula 10]

$$d = f_{CL} \qquad (10)$$

Formula 10 is substituted into Formula 9 to obtain:

[Formula 11]

$$\frac{1}{f_{FL \cdot CL}} = \frac{1}{f_{FL}} + \frac{1}{d} - \frac{d}{f_{FL} d} \qquad (11)$$

$$\frac{1}{f_{FL \cdot CL}} = \frac{f_{FL} + d - d}{f_{FL} d}$$

$$f_{FL \cdot CL} = d$$

Formula 11 indicates that FL–CL distance d is equal to FL·CL synthesizing focal distance $f_{FL \cdot CL}$ and that reducing FL–CL distance d enables a reduction in the size of each arc image $I_{arc}$ formed on IT2. On the basis of this knowledge, even when the optical system of the U- or S-shaped arrangement has a relatively long FL·CL synthesizing focal distance $f_{FL \cdot CL}$, provided that the optical system is configured so that CL substantially parallelizes principle rays from FL, reducing the FL–CL distance d enables a reduction in FL·CL synthesizing focal distance $f_{FL \cdot CL}$ and a reduction in the size of each arc image $I_{arc}$. Reducing the size of each arc image $I_{arc}$ improves polarization conversion efficiency and thus illumination efficiency.

Reducing FL–CL distance d changes FL·CL synthesizing focal distance $f_{FL \cdot CL}$ and the position of a principal point for FL and CL. The focal position is thus moved, resulting in a failure to focus on the LCD. Thus, when FL–CL distance d has been changed, focal distance $f_{FL}$ of FL and focal distance $f_{CL}$ of CL need to be simultaneously adjusted to focus on the LCD.

Focal distance $f_{FL}$ of FL and focal distance $f_{CL}$ of CL resulting from a change in FL–CL distance d can be determined as follows.

When the distance between FL and CL resulting from the change is defined as L, the distance L is given by:

[Formula 12]

$$L = f_{FL \cdot CL} + \left(d - \frac{f_{FL \cdot CL} \times d}{f_{FL}}\right) \quad (12)$$

Formula 11 is substituted into Formula 12 to obtain:

[Formula 13]

$$L = d + d - \frac{d^2}{f_{FL}}$$
$$L = 2d - \frac{d^2}{f_{FL}} \quad (13)$$
$$f_{FL} = \frac{d^2}{2d - L}$$

Accordingly, when the distance between FL and CL is reduced by $\Delta d$, focal distance $f_{FL}$ of FL and focal distance $f_{CL}$ of CL are determined which meet the relation expressed by:

[Formula 14]

$$f_{CL} = d - \Delta d \quad (14)$$

[Formula 15]

$$f_{FL} = \frac{(d - \Delta d)^2}{2d - \Delta d - L} \quad (15)$$

Furthermore, in polarization converting element PBS, part of incident light which falls out of the effective aperture of each polarization converting section does not contribute to polarization conversion. To improve polarization conversion efficiency, FL–CL distance d is desirably set so that the size of each of the arc images (rectangular image) of the light source formed on integrator IT2 by each of the lens cells of integrator IT1 falls within the range of the effective aperture of each of the polarization converting sections of the polarization converting element. The desirable range of FL–CL distance d will be described below.

When the aperture pitch of polarization converting element PBS is defined as $l_{PBS}$, if the following condition is met:

[Formula 16]

$$l_{PBS} > l_{arc} \quad (16)$$

the size of each of the arc images (rectangular images) formed on integrator IT2 computationally falls within the range of the effective aperture of each of the polarization converting sections of the polarization converting element. This makes it possible to eliminate the loss of polarization conversion efficiency.

Now, Formula 8 is substituted into Formula 16 to obtain:

[Formula 17]

$$l_{PBS} \geq l_{LAMP} \times \frac{NA}{\sin\left(2\tan^{-1}\frac{l_{LCD}}{f_{FL \cdot CL}}\right)} \quad (17)$$

$$l_{PBS} \geq l_{LAMP} \times \frac{NA}{\sin\left(2\tan^{-1}\frac{l_{LCD}}{d}\right)}$$

$$d \leq \frac{l_{LCD}}{\tan\left(\frac{\sin^{-1}\left(\frac{l_{LAMP} \times NA}{l_{PBS}}\right)}{2}\right)}$$

Designing the optical system such that FL–CL distance d meets Formula 17 makes the size of each of the arc images formed on integrator IT2 equal to or smaller than that of the effective aperture of polarization converting element PBS. This enables a reduction in the loss in polarization conversion efficiency. The lower limit of FL–CL distance d can be appropriately set in accordance with the design.

Utilizing the above-described principle and on the basis of the knowledge that when an optical system of the U- or S-shaped arrangement is configured so that CL makes principal rays from FL parallel, FL·CL distance d is equal to FL·CL synthesizing focal distance $f_{FL \cdot CL}$, the present invention reduces FL–CL distance d to provide an optical system having a reduced FL·CL synthesizing focal distance $f_{FL \cdot CL}$. Such an optical system enables a reduction in the size of each arc image $I_{arc}$ formed on IT2, allowing the illumination efficiency to be improved.

Furthermore, the optical system is designed so that the FL–CL distance d meets the condition expressed by Formula 17. This provides an illuminating optical system with an increased polarization conversion efficiency.

Description will be given, as an exemplary embodiment of the present invention, of an optical system of the U-shaped arrangement to which the above-described principle is applied in order to reduce FL–CL distance d and thus the size of each arc image $I_{arc}$ formed on IT2.

(First Exemplary Embodiment)

Figure 4:
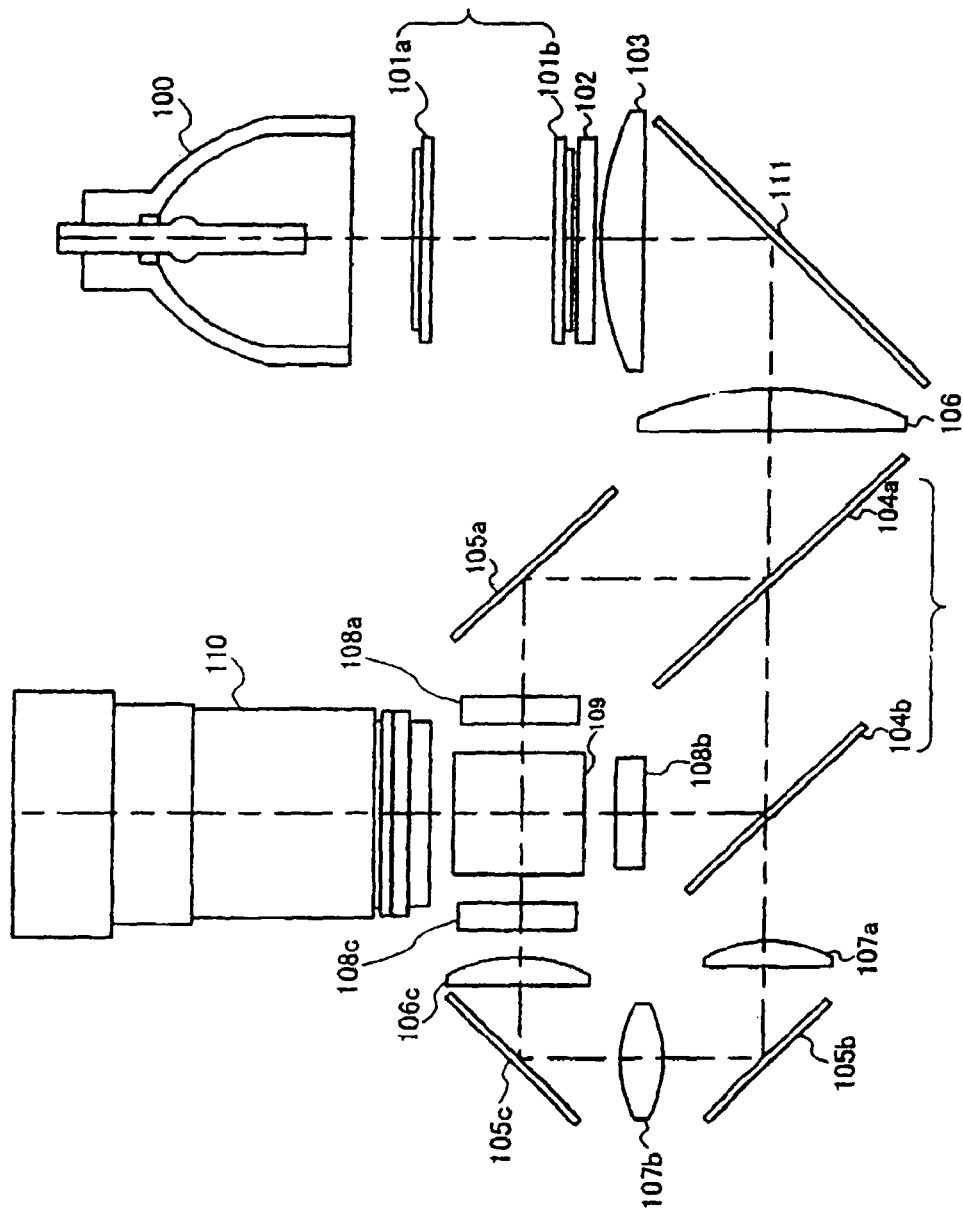
FIG. 4 is a schematic diagram showing the configuration of an illuminating optical system for a liquid crystal projector according to an exemplary embodiment of the present invention.

FIG. 4 shows the configuration of an illuminating optical system for a liquid crystal projector according to a first exemplary embodiment. As shown in FIG. 4, the illuminating optical system according to the exemplary embodiment corresponds to the optical system shown in FIG. 2 and from which condenser lenses 106a and 106b are omitted, with condenser lens 106 located between dichroic mirror 104a and fold-back mirror 111. The optical system is configured to superimposedly irradiate liquid crystal panels 108a and 108b, through field lens 103, with a luminous flux from light source 100 divided by integrator 101a. The arc images of light source 100 are formed on integrator 101b and in the vicinity of integrator 101b by integrator 101a.

Condenser lens 106 is configured to substantially parallelize principal rays of a luminous flux having passed through field lens 103, located between polarization converting element 102 and fold-back mirror 111. The distance between field lens 103 and condenser lens 106 is equal to the synthesizing focal distance for field lens 103 and condenser lens 106. Consequently, reducing the distance between field lens 103 and condenser lens 106 makes it possible to provide an optical system with a reduced synthesizing focal distance for field lens 103 and condenser lens 106.

Figure 2:
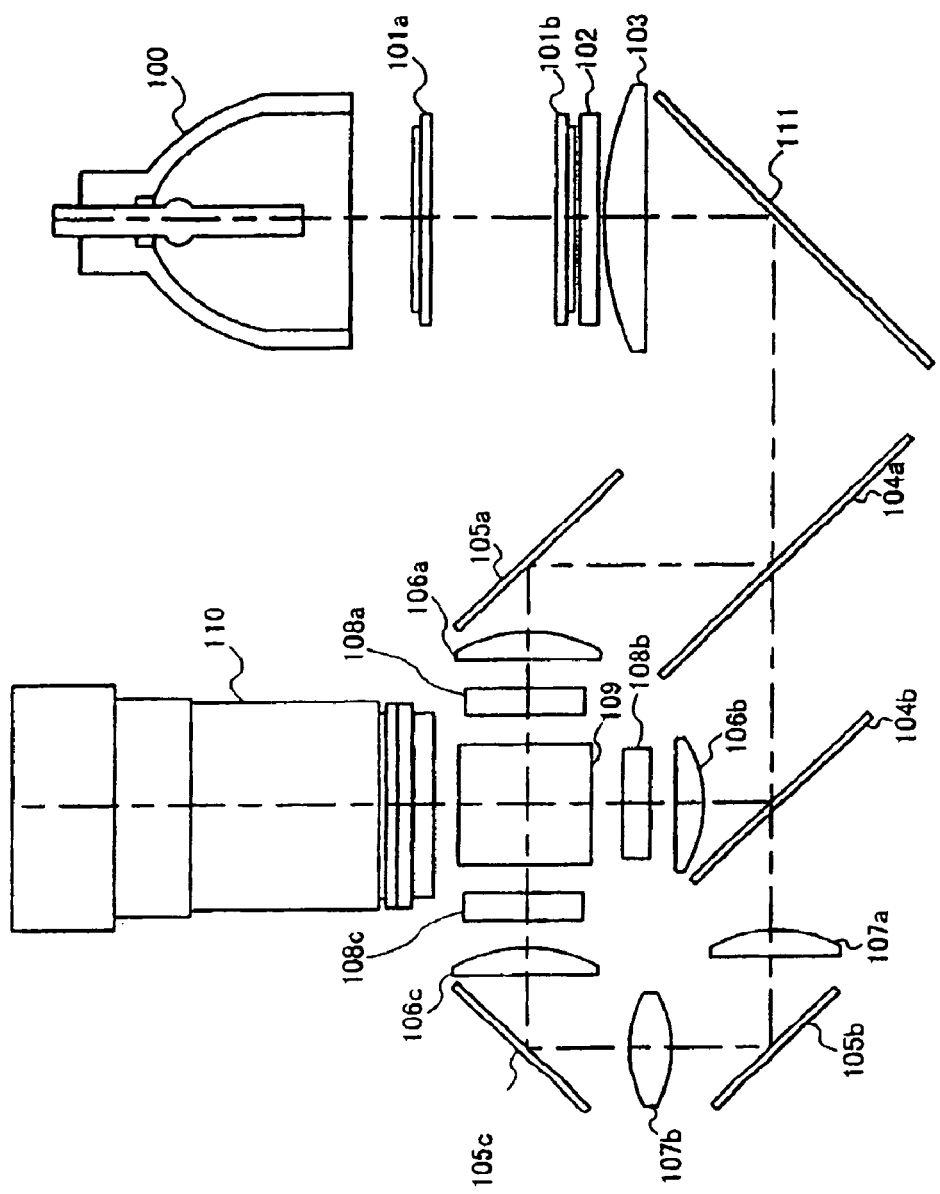
FIG. 2 is a schematic diagram showing the configuration of an illuminating optical system with a U-shaped arrangement according to the related art.

In the illuminating optical system according to the exemplary embodiment, the distance between field lens 103 and condenser lens 106 is shorter than that between field lens 103 and condenser lens 106a (or condenser lens 106b) in the optical system of the U-shaped arrangement shown in FIG. 2. Thus, the synthesizing focal distance for the field lens and the condenser lens is shorter than that in the optical system shown in FIG. 2. Consequently, compared to the optical system shown in FIG. 2, the optical system according to the exemplary embodiment enables a reduction in the size of each of the arc images formed on integrator 101b and in the vicinity of integrator 101b. This correspondingly reduces the amount of eclipse in polarization converting element 102 to improve polarization conversion efficiency.

The illuminating optical system according to the exemplary embodiment includes fewer condenser lenses than the optical system shown in FIG. 2, enabling a reduction in costs.

In the optical path having relay lenses 107a and 107b, an optical path from integrator 101a to liquid crystal panel 108c is longer than the other optical paths. This needs to be corrected. Thus, the optical path length is corrected by relay lenses 107a and 107b and condenser lens 106c. Specifically, relay lenses 107a and 107b once invert the image and irradiate liquid crystal panel 108c with the inverted image so that condenser lens 106c substantially parallelizes principal rays for the inverted image.

According to the exemplary embodiment, to provide an illuminating optical system having increased polarization conversion efficiency, the distance between field lens 103 and condenser lens 106 is desirably set so as to satisfy formula 17 described above.

(Second Exemplary Embodiment)

Figure 8:
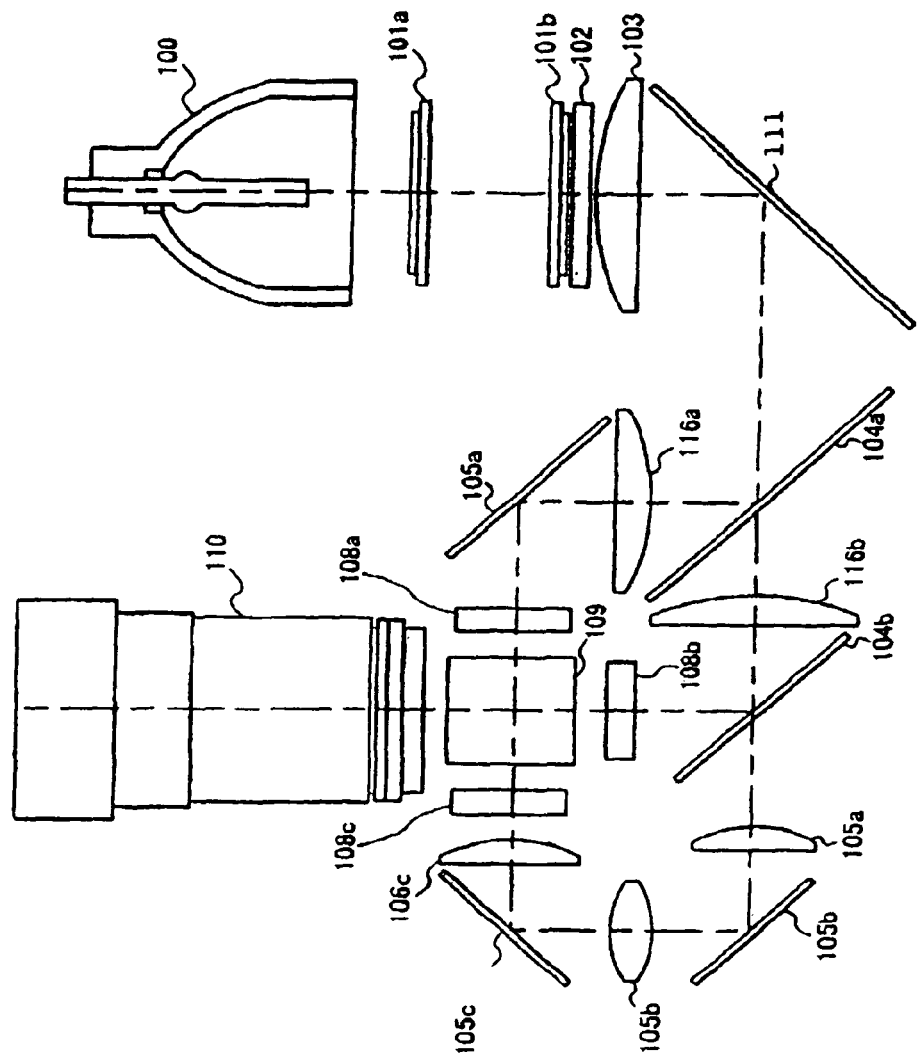
FIG. 8 is a schematic diagram showing the configuration of an illuminating optical system for a liquid crystal projector according to an exemplary embodiment of the present invention.

FIG. 8 shows the configuration of an illuminating optical system for a liquid crystal projector according to a second exemplary embodiment. As shown in FIG. 8, the illuminating optical system according to the exemplary embodiment corresponds to the optical system shown in FIG. 2 and from which condenser lenses 106a and 106b are omitted, with condenser lens 116a located between dichroic mirror 104a and mirror 105a and condenser lens 116b located between dichroic mirrors 104a and 104b. The optical system is configured to superimposedly irradiate liquid crystal panels 108a and 108b with a luminous flux from light source 100 divided by integrator 101a, the luminous flux having passed through field lens 103 and condenser lenses 116a and 116b.

Each of condenser lenses 116a and 116b is configured to substantially parallelize principal rays of a luminous flux having passed through field lens 103 located between polarization converting element 102 and fold-back mirror 111. The distance between field lens 103 and condenser lens 116a is equal to the synthesizing focal distance for field lens 103 and condenser lens 116a. Consequently, reducing the distance between field lens 103 and condenser lens 116a makes it possible to provide an optical system having a reduced synthesizing focal distance for field lens 103 and condenser lens 116a. Similarly, the distance between field lens 103 and condenser lens 116b is equal to the synthesizing focal distance for field lens 103 and condenser lens 116b. Consequently, reducing the distance between field lens 103 and condenser lens 116b makes it possible to provide an optical system having a reduced synthesizing focal distance for field lens 103 and condenser lens 116b.

In the illuminating optical system according to the exemplary embodiment, the distance between field lens 103 and each of condenser lenses 116a and 116b is shorter than that between field lens 103 and each of condenser lenses 106a and 106b in the optical system of the U-shaped arrangement shown in FIG. 2. Consequently, the synthesizing focal distance for field lens 103 and condenser lens 116a and the synthesizing focal distance for field lens 103 and condenser lens 116b are shorter than those in the optical system shown in FIG. 2. Thus, in the exemplary embodiment, the distance between the field lens and the condenser lens is reduced to shorten the synthesizing focal distance between those. This enables a reduction in the size of each of the arc images formed on integrator 101b. The amount of eclipse in polarization converting element 102 is correspondingly reduced to improve polarization conversion efficiency.

According to the exemplary embodiment, to provide an illuminating optical system having increased polarization conversion efficiency, the distance between field lens 103 and each of condenser lenses 116a and 116b is desirably set so as to satisfy formula 17, shown above.

EXAMPLE

FIG. 9 shows design data on the optical elements of the illuminating optical system shown in FIG. 8. The design data has been calculated using existing optical simulation software. In FIG. 9, "IT1" and "IT2" correspond to integrators 101a and 101b, respectively. "PBS" and "FL" correspond to polarization converting element 102 and field lens 103, respectively. "CL" and "LCD" correspond to condenser lens 116a (or 116b) and liquid crystal panel 108a (or 108b), respectively. A "Radius" column shows the radii of curvature of surfaces of the arranged optical elements (IT1, IT2, PBS, FL, CL, and LCD) in millimeters. "∞" in the "Radius" column denotes a plane. A "Thickness" column shows the thickness of each of the optical elements or the distance between the optical elements in millimeters. An "Index" column shows the refractive index of each of the optical elements. The distance between the optical elements is shown as a linear distance equivalent.

In the illuminating optical system according to the example, integrator IT1 includes an incident surface (the incident surface of each lens cell) with a radius of curvature of 14.9 mm and a flat exit surface. Integrator IT1 has a thickness of 3.16 mm and a refractive index of 1.474. The distance between integrators IT1 and IT2 is 26.9 mm.

Integrator IT2 includes a flat incident surface and an exit surface (the exit surface of each lens cell) with a radius of curvature of 14.9 mm. Integrator IT2 has a thickness of 3.16 mm and a refractive index of 1.474. The distance between integrator IT2 and polarization converting element PBS is 2.44 mm. Here, the minus sign of the radius of curvature in FIG. 9 indicates that the surface projects in a direction in which light travels.

Polarization converting element PBS includes a flat incident surface and a flat exit surface and has a thickness of 4 mm and a refractive index of 1.523. The distance between polarization converting element PBS and field lens (FL) is 2 mm. Thus, the polarization converting section (polarization converting element PBS) has effective aperture $I_{PBS}$ of 4 mm.

Field lens (FL) includes an incident surface with a radius of curvature of 257 mm and a flat exit surface. Field lens (FL) has a thickness of 5 mm and a refractive index of 1.624. The distance between field lens (FL) and condenser lens (CL) is 158.3 mm.

Condenser lens (CL) includes an incident surface with a radius of curvature of 101 mm and a flat exit surface. Condenser lens (CL) has a thickness of 7 mm and a refractive index of 1.624. The distance between condenser lens (CL) and liquid crystal panel (LCD) is 92.7 mm.

Liquid crystal panel (LCD) is a one inch XGA panel (4:3) in which the length of the panel is 20.32 mm.

The light source arc has effective aperture ($I_{LAMP}$) of 1.1 mm. The light source has numerical aperture (NA) of 0.766.

COMPARATIVE EXAMPLE

Figures 10, 11:
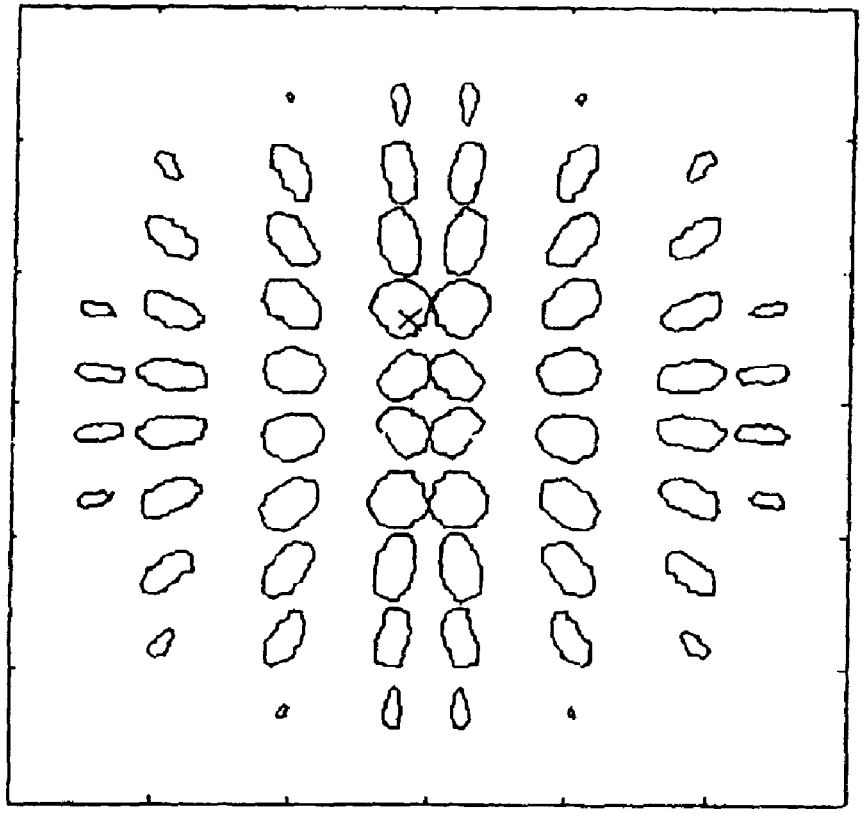
FIG. 10 is a diagram showing design data on an illuminating optical system in a comparative example.
FIG. 11 is a schematic diagram showing arc images formed on an integrator in the illuminating optical system based on the design data shown in FIG. 9.

FIG. 10 shows design data on the optical elements of the illuminating optical system of the U-shaped arrangement shown in FIG. 2. The design data has also been calculated using the existing optical simulation software. In FIG. 10, "IT1" and "IT2" correspond to integrators 101a and 101b, respectively. "PBS" and "FL" correspond to polarization converting element 102 and field lens 103, respectively. "CL" and "LCD" correspond to condenser lens 106a (or 106b) and liquid crystal panel 108a (or 108b), respectively. A "Radius" column shows the radii of curvature of surfaces of the arranged optical elements (IT1, IT2, PBS, FL, CL, and LCD) in millimeters. "∞" in the "Radius" column denotes a plane. A "Thickness" column shows the thickness of each of the optical elements or the distance between the optical elements in millimeters. An "Index" column shows the refractive index of each of the optical elements. The distance between the optical elements is shown as a linear distance equivalent.

In the illuminating optical system in the comparative example, integrator IT1 includes an incident surface (the incident surface of each lens cell) with a radius of curvature of 22.8 mm and a flat exit surface. Integrator IT1 has a thickness of 3.16 mm and a refractive index of 1.474. The distance between integrators IT1 and IT2 is 43.6 mm.

Integrator IT2 includes a flat incident surface and an exit surface (the exit surface of each lens cell) with a radius of curvature of 22.8 mm. Integrator IT2 has a thickness of 3.16 mm and a refractive index of 1.474. The distance between integrator IT2 and polarization converting element PBS is 2.44 mm.

Here, the minus sign of the radius of curvature in FIG. 10 indicates that the surface projects in a direction in which light travels, as defined in the above example.

Polarization converting element PBS includes a flat incident surface and a flat exit surface. Polarization converting element PBS has a thickness of 4 mm and a refractive index of 1.523. The distance between polarization converting element PBS and field lens (FL) is 2 mm. Thus, the polarization converting section (polarization converting element PBS) has effective aperture $I_{PBS}$ of 4 mm.

Field lens (FL) includes an incident surface with a radius of curvature of 163 mm and a flat exit surface and has a thickness of 5 mm and a refractive index of 1.624. The distance between field lens (FL) and condenser lens (CL) is 244 mm.

Condenser lens (CL) includes an incident surface with a radius of curvature of 154.3 mm and a flat exit surface and has a thickness of 7 mm and a refractive index of 1.624. The distance between condenser lens (CL) and liquid crystal panel (LCD) is 6.9 mm.

Liquid crystal panel (LCD) is a one inch XGA panel (4:3) in which the length of the panel is 20.32 mm.

The light source arc has effective aperture ($I_{LAMP}$) of 1.1 mm. The light source has numerical aperture (NA) of 0.766.

Here, on the basis of Formula 17, the threshold value of the FL–CL distance is 190.8 mm. In the illuminating optical system in the above comparative example, the FL–CL interval is 244 mm. In the illuminating optical system according to the example, the FL–CL distance is 158.3 mm, which is shorter than that in the comparative example. Furthermore, the example meets the condition expressed by Formula 17. That is, each of the arc images formed on integrator IT2 is as large as or smaller than the effective aperture of polarization converting element PBS. The loss in polarization conversion efficiency is thus expected to be reduced.

Figure 12:
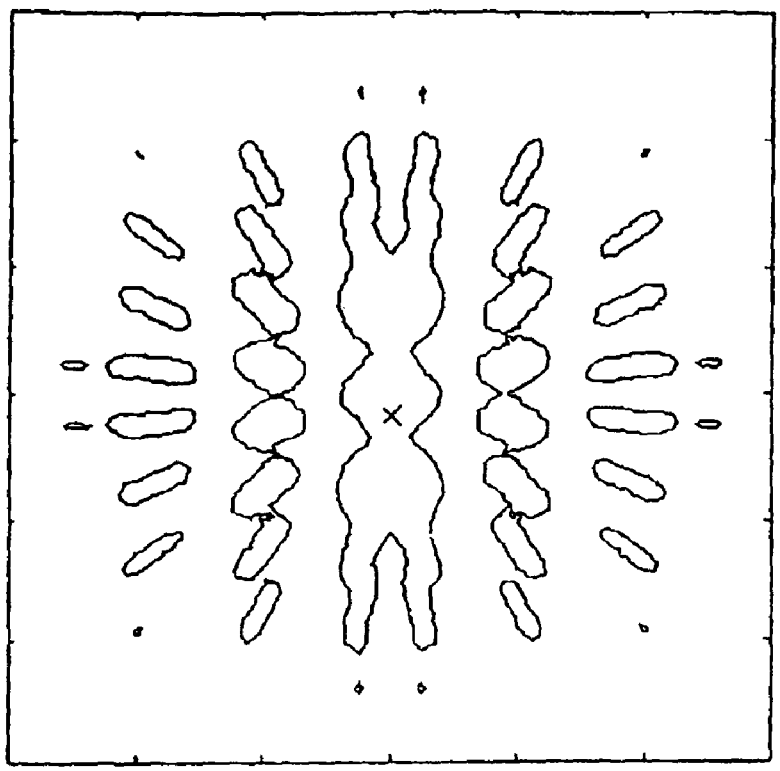
FIG. 12 is a schematic diagram showing arc images formed on an integrator in the illuminating optical system based on the design data shown in FIG. 10.

FIG. 11 schematically shows the arc images formed on IT2 in the illuminating optical system based on the design data shown in FIG. 9. FIG. 12 schematically shows the arc images formed on IT2 in the illuminating optical system based on the design data shown in FIG. 10.

As shown in FIGS. 11 and 12, the arc images formed on IT2 by the lens cells of IT1 extend radially from the center toward outer periphery of IT2. In polarization converting element PBS, the polarizing converting sections are arranged in association with the intervals among the arc images formed by the respective lens cells. If the arc images are each larger than the effective aperture of the polarization converting section, the polarization conversion efficiency may decrease. Each of the arc images shown in FIG. 11 is smaller than that shown in FIG. 12. This indicates that the illuminating optical system based on the design data shown in FIG. 9 offers a higher polarization conversion efficiency than that based on the design data shown in FIG. 10.

Figure 13:
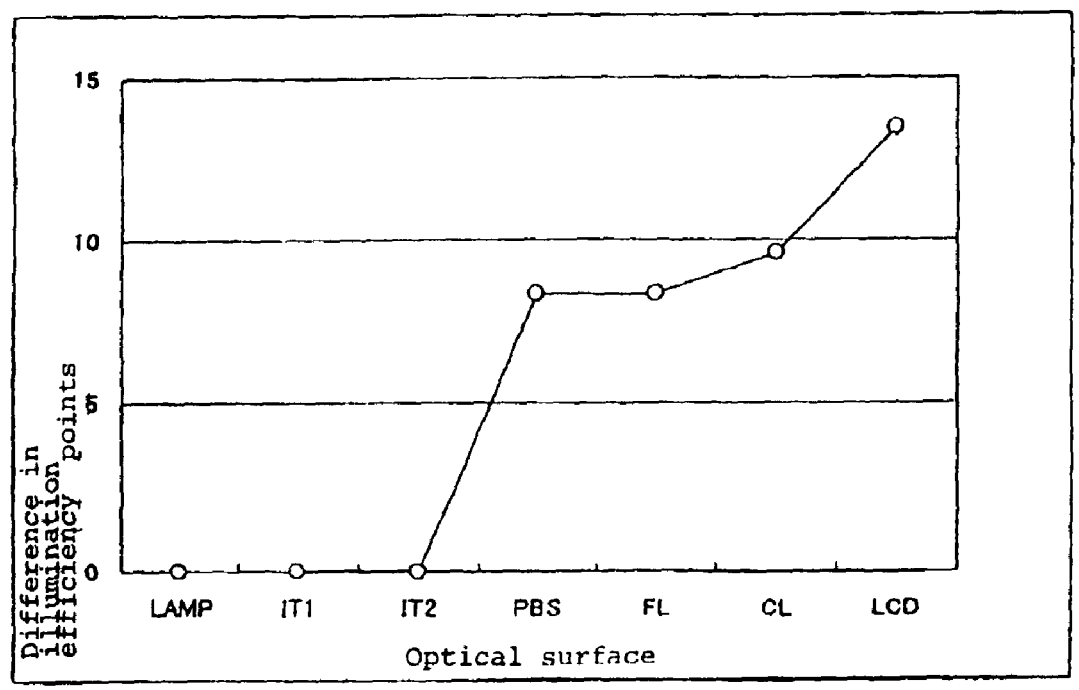
FIG. 13 is a diagram showing a difference in illumination efficiency between the illuminating optical system according to the exemplary embodiment of the present invention and the illuminating optical system in the comparative example.

FIG. 13 shows the difference between the illumination efficiency of the optical elements of the illuminating optical system according to the example shown in FIG. 9 and that of the optical elements of the illuminating optical system in the comparative example shown in FIG. 10. Positive numerical values in the figure each indicate that the example achieves an illumination efficiency higher than that in the comparative example by that numerical value. FIG. 13 shows that the illuminating optical system according to the example used polarization converting element PBS to increase the illumination efficiency by about 8 points to finally achieve an illumination efficiency of 13 points. An increase in illumination efficiency by 13 points means that for example, the illumination efficiency increased from 60% to 73%.

The exemplary embodiments of the invention have been described by using the illuminating optical system of the U-shaped arrangement as an example. However, the present invention is not limited to the U-shaped arrangement. For example, effects similar to those of the illuminating optical systems according to the first and second exemplary embodiments are exerted by applying the arrangement of the field lens and the condenser lens, as shown in FIGS. 4 and 8, to the illuminating optical system of the S-shaped arrangement shown in FIG. 3. Likewise, effects similar to those of the illuminating optical systems according to the first and second exemplary embodiments are exerted by applying the arrangement of the field lens and the condenser lens, as shown in FIGS. 4 and 8, to the illuminating optical system of the L-shaped arrangement shown in FIG. 1.

In the above-described illuminating optical system, the relationship between color components and optical paths obtained by separation by dichroic mirrors 104a and 104b can be appropriately determined in accordance with the design.

As is apparent from the description, an aspect of the present invention provides an illuminating optical system for a projector including a light source and a plurality of display panels, the system comprising a first integrator that includes a plurality of lens cells that divide a luminous flux emitted by the light source into a plurality of partial luminous fluxes and that condense the respective partial luminous fluxes, a second integrator comprising a plurality of lens cells on which the plurality of partial luminous fluxes are incident, a polarization converting element that uniformizes polarizing directions of the luminous fluxes that have passed through the lens cells of the second integrator, and color separating unit that separates each of the luminous fluxes from the polarization converting element into a plurality of color lights of different wavelengths. A field lens and a condenser lens are arranged between the polarization converting element and the separating unit to superimpose the luminous fluxes having passed through the lens cells of the first integrator, on the plurality of display panels. The condenser lens is located closer to the color separating unit.

In this aspect, the optical system may further comprise a mirror located between the field lens and the condenser lens to reflect the luminous fluxes from the field lens toward the condenser lens.

Furthermore, the polarization converting element may comprise a plurality of polarization converting elements arranged in association with intervals among arc images of the light source formed on the second integrator. When the effective aperture of the arc image of the light source formed on the second integrator by each of the lens cells of the first integrator is defined as $I_{arc}$, the effective aperture of the arc of the light source is defined as $I_{LAMP}$, the numerical aperture of the light source is defined as NA, the length of a long side of each of the plurality of display panels is defined as $I_{LCD}$, the effective aperture of each of the plurality of polarization converting sections is defined as $I_{PBS}$, and the distance between the condenser lens and the field lens on an optical axis is defined as d, then the distance d may be set so as to meet a condition expressed by Formula 17.

Another aspect of the present invention provides an illuminating optical system for a projector including a light source and a plurality of display panels, the system comprising a first integrator that includes a plurality of lens cells that divide a luminous flux emitted by the light source into a plurality of partial luminous fluxes and that condense the respective partial luminous fluxes, a second integrator comprising a plurality of lens cells on which the plurality of partial luminous fluxes are incident, a polarization converting element that uniformizes polarizing directions of the luminous fluxes that have passed through the lens cells of the second integrator, a first dichroic mirror that reflects a first color light of the luminous flux from the polarization converting element while allowing a second color light and a third color light in the luminous flux to pass through the second and third color lights comprising wavelength regions different from that of the first color light, a second dichroic mirror that reflects the second color light in the luminous flux that has passed through the first dichroic mirror while allowing the third color light in the luminous flux to pass through, a first reflection mirror that reflects the first color light reflected by the first dichroic mirror, a field lens located between the polarization converting element and the first dichroic mirror, a first condenser lens located between the first dichroic mirror and the first reflection mirror, and a second condenser lens located between the first dichroic mirror and the second dichroic mirror. The field lens is configured to superimpose the luminous fluxes that have passed through the lens cells of the first integrator, on the plurality of display panels.

In another aspect, the illuminating optical system further comprises a second reflection mirror located between the field lens and the first dichroic mirror to reflect the luminous fluxes from the field lens toward the first dichroic mirror.

Furthermore, the polarization converting element comprises a plurality of polarization converting sections arranged in association with the intervals among arc images of the light source formed on the second integrator. When the effective aperture of the arc image of the light source formed on the second integrator by each of the lens cells of the first integrator is defined as $I_{arc}$, the effective aperture of the arc of the light source is defined as $I_{LAMP}$, the numerical aperture of the light source is defined as NA, the length of a long side of each of the plurality of display panels is defined as $I_{LCD}$, the effective aperture of each of the plurality of polarization converting sections is defined as $I_{PBS}$, and a distance between the field lens and the first condenser lens, and a distance between the field lens and the second condenser lens on an optical axis are defined as d then the distance d may be set so as to meet the condition expressed by Formula 17.

In each of the aspects of the present invention, the field lens and the condenser lens allow the luminous fluxes that have passed through the respective lens cells of the first integrator to enter the plurality of display panels substantially parallel to one another and to be superimposed on the plurality of display panels. In this configuration, the distance between the field lens and the condenser lens (the distance that is obtained on a ray passing through the center of each lens) is equal to the synthesizing focal distance for the field lens and the condenser lens. In each aspect of the present invention, the synthesizing focal distance for the field lens and the condenser lens is shorter than that in the illuminating optical system shown in FIGS. 1 to 3. This enables a reduction in the distance between the field lens and the condenser lens. Reducing the synthesizing focal distance for the field lens and the condenser lens provides an optical system in which the first integrator has a short focal distance. Since in each aspect of the present invention, the synthesizing focal distance for the field lens and the condenser lens is shorter than that in the illuminating optical system shown in FIGS. 1 to 3, the size of each of the arc images of the light source formed on the second integrator can be reduced.

Figure 1:
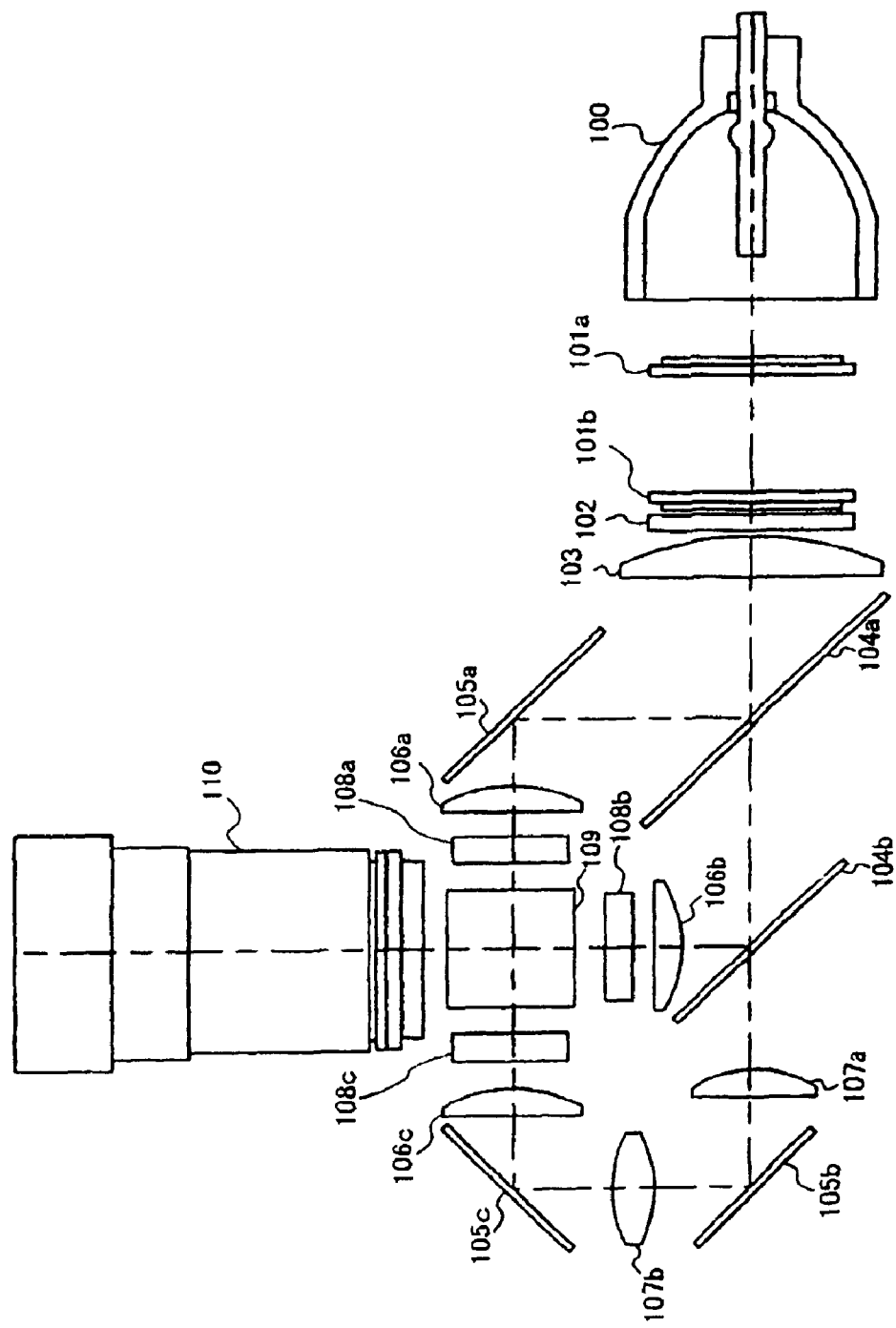
FIG. 1 is a schematic diagram showing the configuration of an illuminating optical system with an L-shaped arrangement according to the related art.
Figure 3:
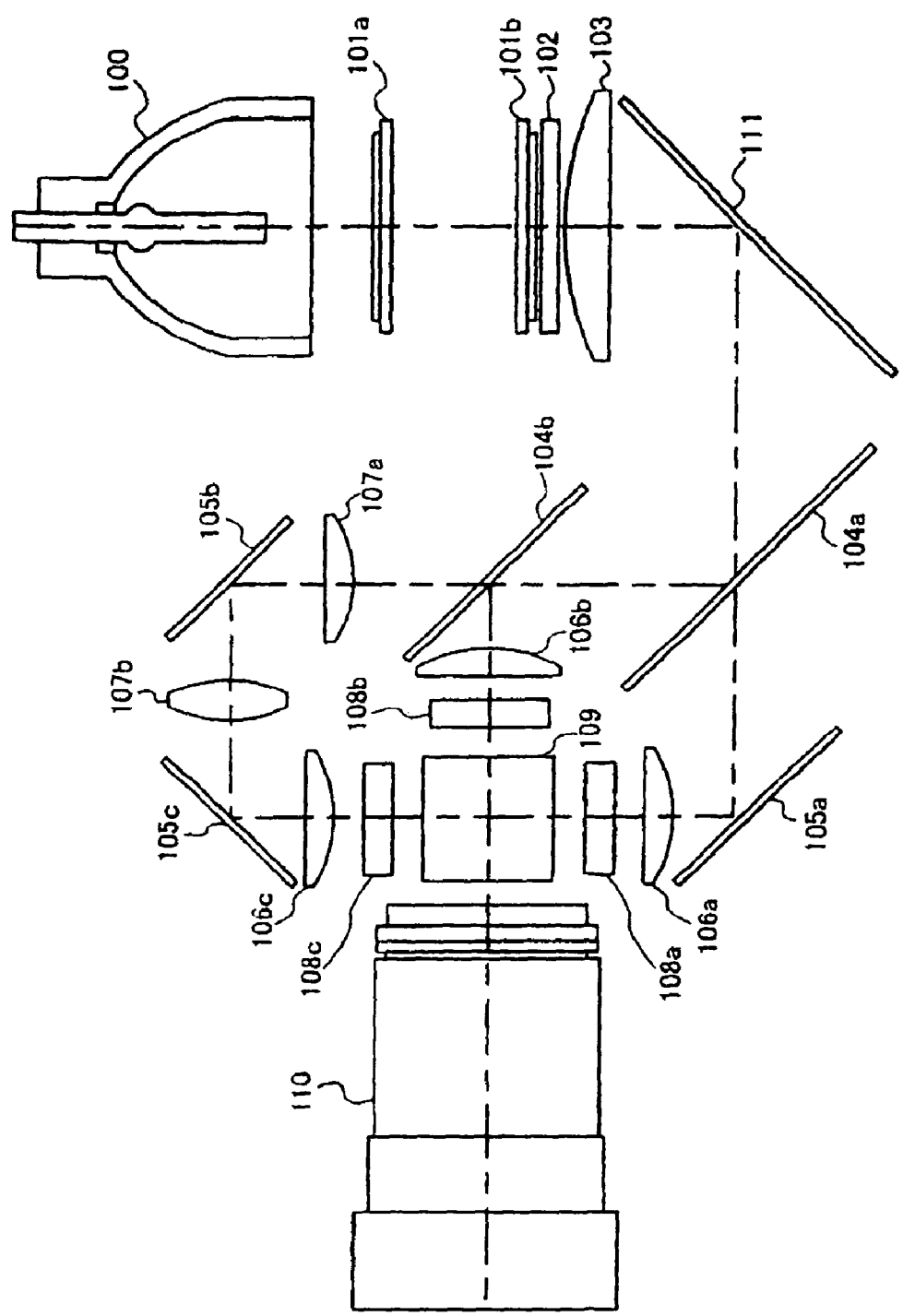
FIG. 3 is a schematic diagram showing the configuration of an illuminating optical system with an S-shaped arrangement according to the related art.

As is apparent from the description, compared to the optical system shown in FIGS. 1 to 3, the present invention enables a reduction in the size of each of the arc images of the light source formed on the second integrator by the lens cells of the first integrator. This enables a reduction in the quantity of light falling out of the effective aperture of each of the polarization converting sections of the polarization converting element. Therefore, the present invention is effective for improving illumination efficiency.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An illuminating optical system for a projector including a light source and a plurality of display panels, said illuminating optical system comprising:
   a first integrator that includes a plurality of lens cells that divide a luminous flux emitted by the light source into a plurality of partial luminous fluxes and that condense the respective partial luminous fluxes;
   a second integrator that includes a plurality of lens cells on which the respective partial luminous fluxes are incident;

a polarization converting element that uniformizes polarizing directions of the luminous fluxes having passed through the respective lens cells of said second integrator; and a color separating unit that separates each of the luminous fluxes from said polarization converting element into a plurality of color lights of different wavelengths, wherein a field lens and a condenser fens are arranged between said polarization converting element and said color separating unit, wherein said field lens superimposes, on said plurality of display panels, the luminous fluxes that have passed through the respective lens cells of said first integrator, wherein said condenser lens is located closer to said color separating unit, and wherein a distance between said condenser lens and said field lens is equal to a synthesized focal distance provided in an optical unit including condenser lens and said field lens.

2. The illuminating optical system for the projector according to claim 1, further comprising a mirror located between said field lens and said condenser lens to reflect the luminous fluxes from said field lens toward said condenser lens.

3. The illuminating optical system for the projector according to claim 1, wherein said polarization converting element comprises a plurality of polarization converting sections arranged in association with intervals among arc images of said light source formed on said second integrator, and when an effective aperture of the arc image of said light source formed on said second integrator by each of said lens cells of said first integrator is defined as $I_{arc}$, an effective aperture of the arc of said light source is defined as $I_{LAMP}$, a numerical aperture of said light source is defined as NA, a length of a long side of each of said plurality of display panels is defined as $I_{LCD}$, an effective aperture of each of said plurality of polarization converting sections is defined as $I_{PBS}$, and a distance between said condenser lens and said field lens on an optical axis is defined as d, then the distance d is set so as to meet a condition expressed by:

$$d \leq \frac{l_{LCD}}{\tan\left(\frac{\sin^{-1}\left(\frac{l_{LAMP} \times NA}{l_{PBS}}\right)}{2}\right)}.$$

4. A projector comprising:

the illuminating optical system according to claim 1; and a plurality of display panels illuminated with luminous fluxes from said illuminating optical system.

5. The illuminating optical system for a projector including a light source and a plurality of display panels according to claim 1, further comprising:

a first dichroic mirror that reflects a first wavelength of light of the luminous flux from the polarization converting element, and allows a second wavelength of light and a third wavelength of light to pass through; and a first reflection mirror that reflects the first wavelength of light reflected by the first dichroic mirror.

6. The illuminating optical system for a projector including a light source and a plurality of display panels according to claim 5, further comprising a second reflection mirror located between the field lens and the first dichroic mirror.

7. The illuminating optical system for a projector including a light source and a plurality of display panels according to claim 5, further comprising a second dichroic mirror that reflects the second wavelength of light that has passed through the first dichroic mirror, and allows the third wavelength of light to pass through.

8. The illuminating optical system for a projector including a light source and a plurality of display panels according to claim 5, wherein the condenser lens is located between the first dichroic mirror and the first reflection mirror.

9. The illuminating optical system for a projector including a light source and a plurality of display panels according to claim 7, wherein a second condenser lens is located between the first dichroic mirror and the second dichroic mirror.

10. An illuminating optical system for a projector including a light source and a plurality of display panels, said illuminating optical system comprising:

first integrating means that includes a plurality of lens cells for dividing a luminous flux emitted by the light source into a plurality of partial luminous fluxes and for condensing the respective partial luminous fluxes;

second integrating means that includes a plurality of lens cells on which the respective partial luminous fluxes are incident;

polarization converting means for uniformizing polarizing directions of the luminous fluxes having passed through the respective lens cells of said second integrating means; and color separating means for separating each of the luminous fluxes from said polarization converting means into a plurality of color lights of different wavelengths, wherein a field lens and a condenser lens are arranged between said polarization converting means and said color separating means, wherein said field lens superimposes, on said plurality of display panels, the luminous fluxes that have passed through the respective lens cells of said first integrating means, and wherein said condenser lens is located closer to said color separating means, and wherein a distance between said condenser lens and said field lens is equal to a synthesized focal distance provided in an optical unit including said condenser lens and said field lens.

11. The illuminating optical system for the projector according to claim 10, further comprising a mirror located between said field lens and said condenser lens to reflect the luminous fluxes from said field lens toward said condenser lens.

12. The illuminating optical system for the projector according to claim 10, wherein said polarization converting means comprises a plurality of polarization converting sections arranged in association with intervals among arc images of said light source formed on said second integrating means, and when an effective aperture of the arc image of said light source formed on said second integrating means by each of said lens cells of said first integrating means is defined as $I_{arc}$, an effective aperture of the arc of said light source is defined as $I_{LAMP}$, a numerical aperture of said light source is defined as NA, a length of a long side of each of said plurality of display panels is defined as $I_{LCD}$, an effective aperture of each of said plurality of polarization converting sections is defined as $I_{PBS}$, and a distance between said condenser lens and said field lens on an optical axis is defined as d, then the distance d is set so as to meet a condition expressed by:

$$d \le \frac{l_{LCD}}{\tan\left(\frac{\sin^{-1}\left(\frac{l_{LAMP} \times NA}{l_{PBS}}\right)}{2}\right)}.$$

13. A projector comprising:
the illuminating optical system according to claim 10; and
a plurality of display panels illuminated with luminous fluxes from said illuminating optical system.

14. An illuminating optical method for a projector including a light source and a plurality of display panels, said illuminating optical method comprising:
dividing, by a first integrator that includes a plurality of lens cells, a luminous flux emitted by the light source into a plurality of partial luminous fluxes and condensing the respective partial luminous fluxes;
making incident, on a second integrator that includes a plurality of lens cells, the respective partial luminous fluxes;
uniformizing, by a polarization converting element, polarizing directions of the luminous fluxes having passed through the respective lens cells of said second integrator; and
separating, by a color separating unit, each of the luminous fluxes from said polarization converting element into a plurality of color lights of different wavelengths,
wherein a field lens and a condenser lens are arranged between said polarization converting element and said color separating unit,
wherein said field lens superimposes, on said plurality of display panels, the luminous fluxes that have passed through the respective lens cells of said first integrator, and
wherein said condenser lens is located closer to said color separating unit, and
wherein a distance between said condenser lens and said field lens is equal to a synthesized focal distance provided in an optical unit including said condenser lens and said field lens.

15. The illuminating optical method for the projector according to claim 14, further comprising a mirror located between said field lens and said condenser lens to reflect the luminous fluxes from said field lens toward said condenser lens.

16. The illuminating optical method for the projector according to claim 14, wherein said polarization converting element comprises a plurality of polarization converting sections arranged in association with intervals among arc images of said light source formed on said second integrator, and
when an effective aperture of the arc image of said light source formed on said second integrator by each of said lens cells of said first integrator is defined as $I_{arc}$, an effective aperture of the arc of said light source is defined as $I_{LAMP}$, a numerical aperture of said light source is defined as NA, a length of a long side of each of said plurality of display panels is defined as $I_{LCD}$, an effective aperture of each of said plurality of polarization converting sections is defined as $I_{PBS}$, and a distance between said condenser lens and said field lens on an optical axis is defined as d, then the distance d is set so as to meet a condition expressed by:

$$d \le \frac{l_{LCD}}{\tan\left(\frac{\sin^{-1}\left(\frac{l_{LAMP} \times NA}{l_{PBS}}\right)}{2}\right)}.$$

* * * * *